US 6,668,239 B1

(12) United States Patent
Gilbert et al.

(10) Patent No.: US 6,668,239 B1
(45) Date of Patent: Dec. 23, 2003

(54) TRACK MONITORING EQUIPMENT

(75) Inventors: David Gilbert, Wirksworth (GB); Peter David Wesley, Derby (GB)

(73) Assignee: Aea Technology PLC, Didcot (GB)

( * ) Notice: Subject to any disclaimer, the term of this patent is extended or adjusted under 35 U.S.C. 154(b) by 0 days.

(21) Appl. No.: 09/979,159

(22) PCT Filed: May 4, 2000

(86) PCT No.: PCT/GB00/01538

§ 371 (c)(1),
(2), (4) Date: Mar. 19, 2002

(87) PCT Pub. No.: WO00/70148

PCT Pub. Date: Nov. 23, 2000

(30) Foreign Application Priority Data

May 14, 1999 (GB) .............................................. 9911170

(51) Int. Cl.[7] ................................................. G06F 11/60
(52) U.S. Cl. ........................ 702/188; 34/342; 34/357.01
(58) Field of Search ............................ 702/188, 33, 34, 702/35, 36, 57, 58, 59, 113, 142, 148, 150, 151, 166, 184; 342/357.01, 457; 246/167, 185

(56) References Cited

U.S. PATENT DOCUMENTS

| | | | | |
|---|---|---|---|---|
| 4,741,207 A | * | 5/1988 | Spangler | 73/146 |
| 5,579,013 A | * | 11/1996 | Hershey et al. | 342/357.06 |
| 5,682,139 A | * | 10/1997 | Pradeep et al. | 340/539.13 |
| 6,397,129 B1 | * | 5/2002 | Lanoix et al. | 701/19 |
| 6,416,020 B1 | * | 7/2002 | Gronskov | 246/169 D |

* cited by examiner

*Primary Examiner*—Marc S. Hoff
*Assistant Examiner*—Edward Raymond
(74) *Attorney, Agent, or Firm*—William H. Holt

(57) ABSTRACT

For monitoring railway tracks on a frequent basis, instrumentation packages are installed in service vehicles (18), for example in passenger carriages. The instrumentation package (16) comprises sensors (35, 36, 42) mounted on a bogie (24) of the vehicle (18), which provide data to a computer (40). The computer (40) processes the data to characterise the track quality, and stores the results tagged with positional information. At intervals these stored results are automatically transferred by radio to a remote base station (12). An operator at the base station can monitor the track quality daily, and hence advise on cost-effective maintenance schedules.

8 Claims, 2 Drawing Sheets

TRACK MONITORING EQUIPMENT

This invention relates to equipment for monitoring railway tracks, in particular for determining the rail profile.

Track recording vehicles are known, which include instruments for measuring many different attributes of a railway track. Such vehicles are expensive both to purchase and to operate, and consequently railway maintenance staff can inspect their lines only at infrequent intervals—typically once a month on the busiest lines, and less frequently on other lines. Hand operated surveying trolleys are also known which are used to measure track parameters, but these are suitable only for short lengths of track, for example in sidings. Equipment to enable frequent and regular monitoring of track condition on substantially the entire railway network would be beneficial, particularly in providing information about the effect of railway traffic on track condition, and in quantifying the effect of maintenance. Such frequent monitoring will also enable railway staff to decide when to remove speed restrictions which may be imposed after track maintenance (such as design overlift); and indeed when to impose speed restrictions if track quality decreases. If track quality can be measured on a daily basis, this would also improve railway safety, and decrease the risk of derailment.

According to the present invention there is provided equipment for monitoring railway tracks, the equipment comprising a base station, at least one instrumentation package installed in a service vehicle, and automatic means for transferring data from the or each instrumentation package to the base station remotely and at intervals, the instrumentation package comprising sensors including at least one accelerometer mounted on the service vehicle, at least one position locating instrument arranged to provide positional information, and a computer arranged to receive data from the sensors and to process and store the data, characterised in that at least one accelerometer is mounted on a bogie of the service vehicle, and that the computer is arranged to process data from this accelerometer to determine linear displacements.

The instrumentation package is sufficiently small that it can be installed on a service vehicle, for example a passenger coach, without causing inconvenience to passengers or staff. Its operations are totally automatic, so no staff are required to monitor it. Consequently the equipment enables the track along which that service vehicle travels to be monitored on every journey, so the track may be monitored several times a day. Because it is installed in a service vehicle, no additional vehicle operating costs are incurred in performing the track monitoring.

The position locating instrument might use GPS. More precise information on position may be obtained using differential GPS, or by detecting the location of objects at known positions along or adjacent to the track such as points or crossings, APC (automatic power control) magnets, or AWS (automatic warning system) magnets. Dead reckoning methods may also be used, including inertial guidance systems, and measuring distance from known positions.

The sensors of the instrumentation package preferably comprise vertical accelerometers mounted on the bogie, one on each side of the bogie, above a wheelset, and also displacement transducers, one on each side of the bogie, arranged to monitor the distance between the wheelset and the bogie. Signals from these sensors enable the undulations of the top of each rail, i.e. the profile of the upper surface of the rail along its length, to be detected and measured. The computer may also receive data from other sensors, in particular a signal indicating the speed of the vehicle; such a signal is typically generated by the wheel slide protection system of the vehicle, or it may be generated by a speed sensor forming part of the instrumentation package. Sensors may also be provided to monitor the lateral position of the rails, and vehicle ride quality.

The invention will now be further and more particularly described, by way of example only, and with reference to the accompanying drawings, in which.

Figure 1:
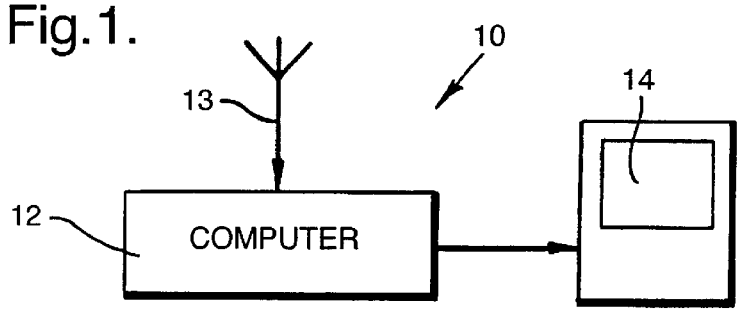
FIG. 1 shows a side view, partly diagrammatic., of a vehicle incorporating a track monitoring system.
Figure 1:
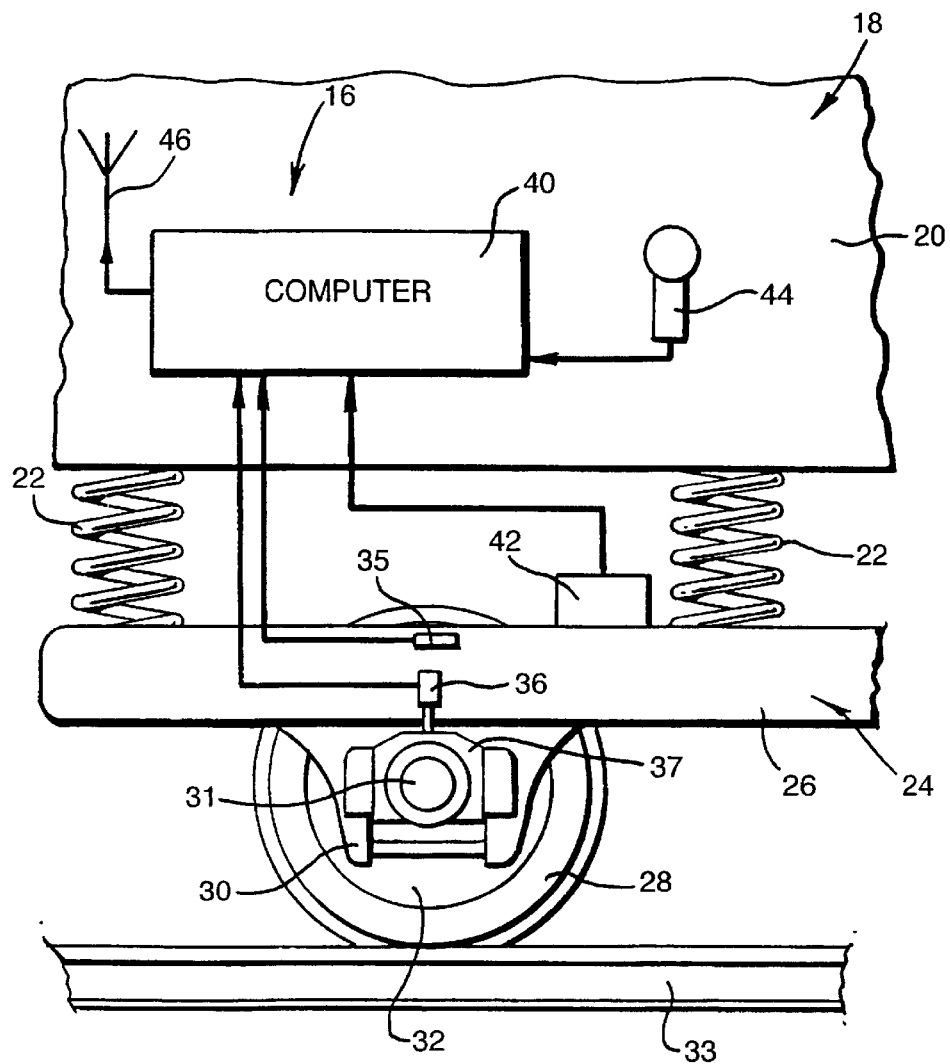

Referring to FIG. 1, a track monitoring system 10 includes a base station computer 12 connected to an aerial 13 and to a display screen 14. The system 10 also incorporates instrumentation packages 16 (only one is shown) which are installed in service vehicles, typically no more than one such instrumentation package 16 in any one train. The figure shows a side view, partly diagrammatic, of parts of a vehicle 18 comprising a body 20 supported on springs 22 on a bogie 24. The bogie 24 includes a frame 26 and two wheelsets 28 (only one is shown), each wheelset 28 being connected by springs to the frame 26 and each end of each wheelset 28 being held in an axle box 30 allowing vertical movement relative to the frame 26. Each wheelset 28 consists of an axle 31 and two wheels 32 which rest on the rails 33 of the track.

The instrumentation package 16 includes vertical accelerometers 35 and linear displacement transducers 36 at each side of the bogie 24. Each accelerometer 35 is attached to the frame 26 directly above the axle box 30, and each linear displacement transducer 36 is connected between the frame 26 and a bearing 37 at the end of the axle 31, so as to measure any vertical displacement of the wheel 32 relative to the frame 26. Signals from the accelerometers 35 and transducers 36 are provided to a computer 40 within the body 20. A tachometer 42 on the bogie 24 measures the rate of rotation of the wheel 32, and supplies electrical signals to the computer 40. A GPS receiver 44 also provides signals to the computer 40. The computer 40 might for example locate beneath a passenger seat in the vehicle.

Within the computer 40 the analogue signals from the accelerometers 35 and the transducers 36 are digitised at 1 kHz. The resulting digital data from each accelerometer 35 are processed (corresponding to double integration) so as to determine the vertical displacements of the frame 26. The corresponding displacements of the top surface of the rail 33 can hence be calculated, knowing the displacement of the wheel 28 relative to the frame 26. Knowing the speed of the vehicle 18 from the tachometer 42, the computer 40 calculates the values of this vertical displacement y every eighth of a meter along the rail. The signal processing also filters out any longer wavelength undulations, for example all undulations of wavelength greater than 35 m. Hence the values of y represent the local displacement of the top surface of the rail 33 from a smooth curve. (It should be appreciated that the term "vertical", in this description, refers to a direction perpendicular to that of the smooth curve followed by the rail; that smooth curve could be found by filtering out all short wavelength undulations of wavelength less than a threshold, and that threshold would usually be usually set at a value less than 100 m.)

Figure 2:
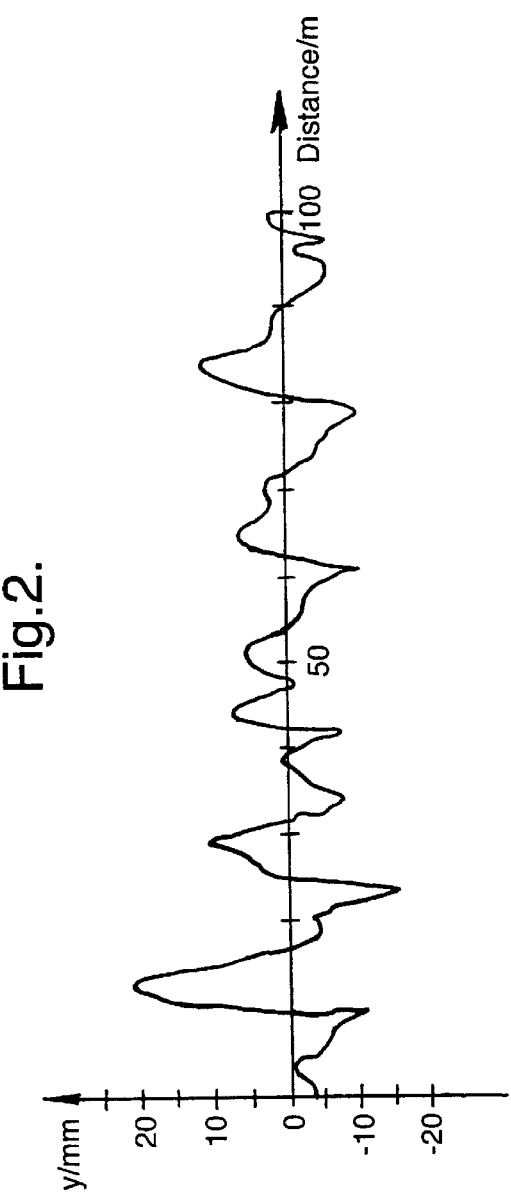
FIG. 2 shows graphically the vertical displacements along the length of a rail, as measured using the monitoring system shown in FIG. 1.

Referring now to FIG. 2, there is shown graphically a set of measurements of vertical displacement y of a rail 33 over a distance of 100 m, as obtained with the system 10. These measurements are virtually identical to those obtained with a standard track measuring device. It will be observed that along this section of track the rail 33 is typically within 10 mm of the smooth curve, but at one point the value of y exceeds 20 mm. With good quality track this detailed information would not be stored, but the computer 40 is arranged to store detailed information over a distance such as 100 m if the value of y exceeds a threshold value—as occurred in this case.

Figure 3:
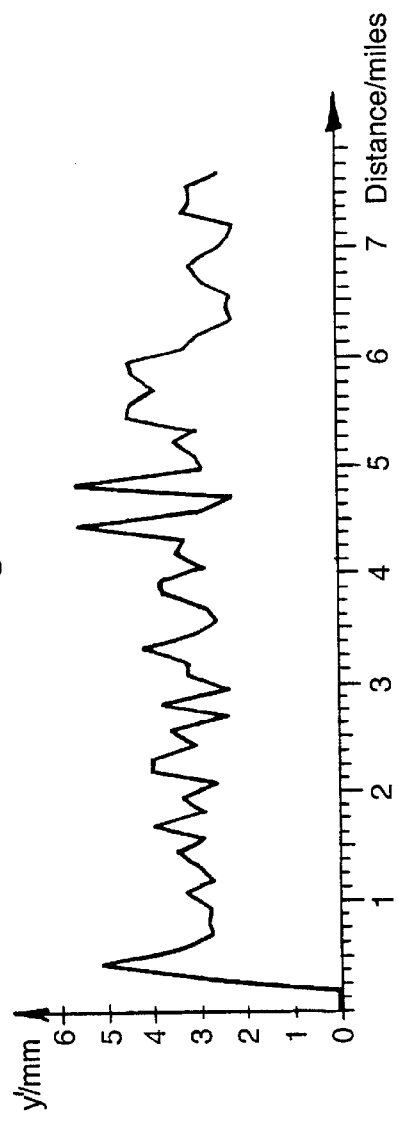
FIG. 3 shows graphically the measured values of vertical displacements over a longer length of track,. after statistical processing.

The values of vertical displacement y are usually further processed, by determining the root mean square value of y (say y') over a set distance, for example over a length of one eighth of a mile (i.e. one furlong; about 201 m). These values of y' may be used as an indication of the smoothness of that length of the rail 33. The computer 40 then stores in its memory the values of y' as calculated for each such length of the rail 33. At intervals the computer 40 transmits all the stored data, via an aerial 46 to the base station 12. This may be in response to a signal from the base station 12, and may, for example, be done once a day. The stored and transmitted data is preferably tagged with positional information obtained from the GPS receiver 44. The values of y' can then be displayed for every section of track along which the vehicle has travelled. Referring now to FIG. 3, this shows graphically the measurements of root mean square vertical displacement, y', for successive furlong lengths of a railway line, over a distance of almost 8 miles (the values of zero at the start of the graph are an artifact arising from the method of calculation).

To check the accuracy of the system 10, a series of eight test runs have been carried out over a section of track to compare the results obtained as described above with those obtained using a conventional analogue track recording system. For each system, the root mean square values, y', were averaged over a distance of 27 furlongs to provide a running mean. The running means for the two systems were then compared for each test run. The maximum difference between the measurements obtained with the two systems was 3.0 percent, while the average (over all the test runs) of the differences between the running means was only 1.2 percent. This confirms that the measurements made with the system 10 are accurate.

As described above, the system 10 obtains information about the longitudinal profile of one rail 33. That information can also be processed differently, for example filtering out wavelengths longer than 70 m. It will be understood that the system 10 simultaneously obtains information about the longitudinal profile of the other rail, from the accelerometer 35 and displacement transducer 36 mounted on the other side of the bogie 24. The information may also be processed to detect if wavelengths are present in the longitudinal profile of either rail 33 which are likely to cause vehicles to resonate vertically, such wavelengths being known as cyclic top. The system 10 also obtains information about the twist of the track, from the differences between the measurements of vertical displacement y for the left and right rail 33, compared over a set distance, for example of 3 m. The resulting twist signal provides an indication of any irregularities in twist and hence indicates any twist faults.

Hence the system 10 enables the track geometry to be recorded frequently, and enables any deterioration of track quality to be monitored. This enables maintenance to be planned cost-effectively, and better maintenance can be expected to lead to improved track quality and longer as set lives. It will be appreciated that track quality is also beneficial to train operators, as it influences the ride comfort experienced by passengers or goods, and because poor track quality gives rise to dynamic forces that cause stresses in the vehicles that can sometimes lead to component failure.

It will be appreciated that the system 10 might differ from that described above, and in particular it might also measure other parameters concerning track quality. For example it might include optical sensors to detect any lateral displacements of the rails. Such detectors would also enable the track gauge to be monitored. Other sensors mounted on the bogie 24 might measure cant, curvature, or gradient. There may also be vertical and lateral accelerometers provided on the body 20, whose signals are provided to the computer 40, to obtain information on the ride quality. Furthermore the computer 40 might be mounted on the underside of the body 20, rather than within it. It will also be appreciated that the signals might be processed differently, for example being digitised at a different frequency preferably in the range 500 Hz to 3000 Hz, for example at 2 kHz. It will also be appreciated that the instrumentation package may be installed on any type of service vehicle, including for example vehicles with air springs, and including for example freight vehicles.

What is claimed is:

1. Equipment for monitoring railway tracks, the equipment comprising a base station, at least one instrumentation package installed in a service vehicle, and automatic means for transferring data from the or each instrumentation package to the base station remotely and at intervals, the instrumentation package comprising sensors including at least one accelerometer, at least one position locating instrument arranged to provide positional information and a computer arranged to receive data from the sensors and to process and store the data, characterised in that at least one accelerometer is mounted on a bogie of the service vehicle, that the equipment also comprises at least one displacement transducer arranged to monitor the distance between the bogie and a wheelset of the bogie and to provide signals to the computer, that the computer is arranged to digitize the signals from the accelerometer, and is arranged to process this digitized data, corresponding to double integration, to determine linear displacements.

2. Equipment as claimed in claim 1 wherein the computer is arranged to process the data so as to filter out any longer wavelength undulations.

3. Equipment as claimed in claim 1 wherein the position locating instrument uses GPS.

4. Equipment as claimed in claim 1 wherein the sensors of the instrumentation package comprise vertical accelerometers mounted on the bogie, one on each side of the bogie, above a wheelset, and also displacement transducers, one on each side of the bogie, arranged to monitor the distance between the wheelset and the bogie.

5. Equipment as claimed in claim 1 also including a sensor to measure the speed of the vehicle.

6. Equipment as claimed in claim 1 also including a sensor to monitor the lateral position of the rails.

7. Equipment as claimed in claim 1 wherein the computer is arranged to digitize data from the said accelerometer at a frequency in the range between 500 Hz and 3000 Hz.

8. Equipment for monitoring railway tracks, the equipment comprising a base station, at least one instrumentation package installed in a service vehicle, and automatic means for transferring data from the or each instrumentation package to the base station remotely and at intervals, the instrumentation package comprising sensors, at least one position locating instrument arranged to provide positional information and a computer arranged to receive data from the sensors and to process and store the data, characterised in that the sensors of the instrumentation package comprise vertical accelerometers mounted on the bogie, one on each side of the bogie, above the wheelset, and also displacement transducers, one on each side of the bogie, arranged to monitor the distance between the wheelset and the bogie, and to provide signals to the computer, that the computer is arranged to digitize the signals from the accelerometer at a frequency in the range between 500 Hz and 3000 Hz, and is arranged to process this digitized data, corresponding to double integration, to determine linear displacements, and to filter out any longer wavelength undulations.

* * * * *